(12) United States Patent
Labbe et al.

(10) Patent No.: US 10,851,664 B2
(45) Date of Patent: Dec. 1, 2020

(54) SEALING ASSEMBLY FOR A GAS TURBINE ENGINE

(71) Applicant: PRATT & WHITNEY CANADA CORP., Longueuil (CA)

(72) Inventors: Michel Labbe, Montreal (CA); Stuart Hodgson, Georgetown (CA); Daniel Poirier, Calixa Lavallée (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 184 days.

(21) Appl. No.: 16/053,406

(22) Filed: Aug. 2, 2018

(65) Prior Publication Data
US 2020/0040754 A1 Feb. 6, 2020

(51) Int. Cl.
*F02C 7/28* (2006.01)
*F01D 11/04* (2006.01)

(52) U.S. Cl.
CPC ............. *F01D 11/04* (2013.01); *F02C 7/28* (2013.01); *F05D 2240/55* (2013.01)

(58) Field of Classification Search
CPC . F16J 15/40; F16J 15/44; F16J 15/441; F01D 11/04; F02C 7/28; F05D 2240/55
See application file for complete search history.

(56) References Cited

U.S. PATENT DOCUMENTS

| 3,964,753 | A  | * | 6/1976  | Junker ............... | F16J 15/30 |
|           |    |   |         |                       | 277/350    |
| 4,088,329 | A  | * | 5/1978  | Junker ............... | F16J 15/30 |
|           |    |   |         |                       | 277/350    |
| 5,301,957 | A  |   | 4/1994  | Hwang et al.          |            |
| 7,175,388 | B2 | * | 2/2007  | Labbe ............... | F01D 11/003 |
|           |    |   |         |                       | 415/174.5  |
| 7,410,341 | B2 |   | 8/2008  | Gockel et al.         |            |
| 9,239,117 | B1 |   | 1/2016  | Craig et al.          |            |
| 9,944,399 | B2 |   | 4/2018  | Desjardins            |            |
| 2006/0239816 | A1 | * | 10/2006 | Labbe ............... | F01D 11/003 |
|           |    |   |         |                       | 415/230    |
| 2009/0142180 | A1 | * | 6/2009  | Munson ............. | F01D 11/001 |
|           |    |   |         |                       | 415/111    |
| 2016/0032840 | A1 |   | 2/2016  | James                 |            |

* cited by examiner

Primary Examiner — Gilbert Y Lee
(74) Attorney, Agent, or Firm — Norton Rose Fulbright Canada LLP

(57) ABSTRACT

A controlled gap radial oil sealing assembly in a gas turbine engine having a centre rotational axis defining an axial direction, the controlled gap radial sealing assembly comprises a seal element located around a cooperating seal runner and sized to define a controlled sealing gap between them, the seal runner having an axial length extending beyond an axial width of the seal element into an oiled region of the engine. A first annular surface radially outwardly spaced from and extending substantially along the axial length of the seal runner, the first annular surface sealingly cooperating with a seal housing of the seal element, and a second annular surface axially extending to overlap at least a portion of the first annular surface, the second annular surface radially outwardly spaced from the first annular surface relative to the center axis.

19 Claims, 5 Drawing Sheets

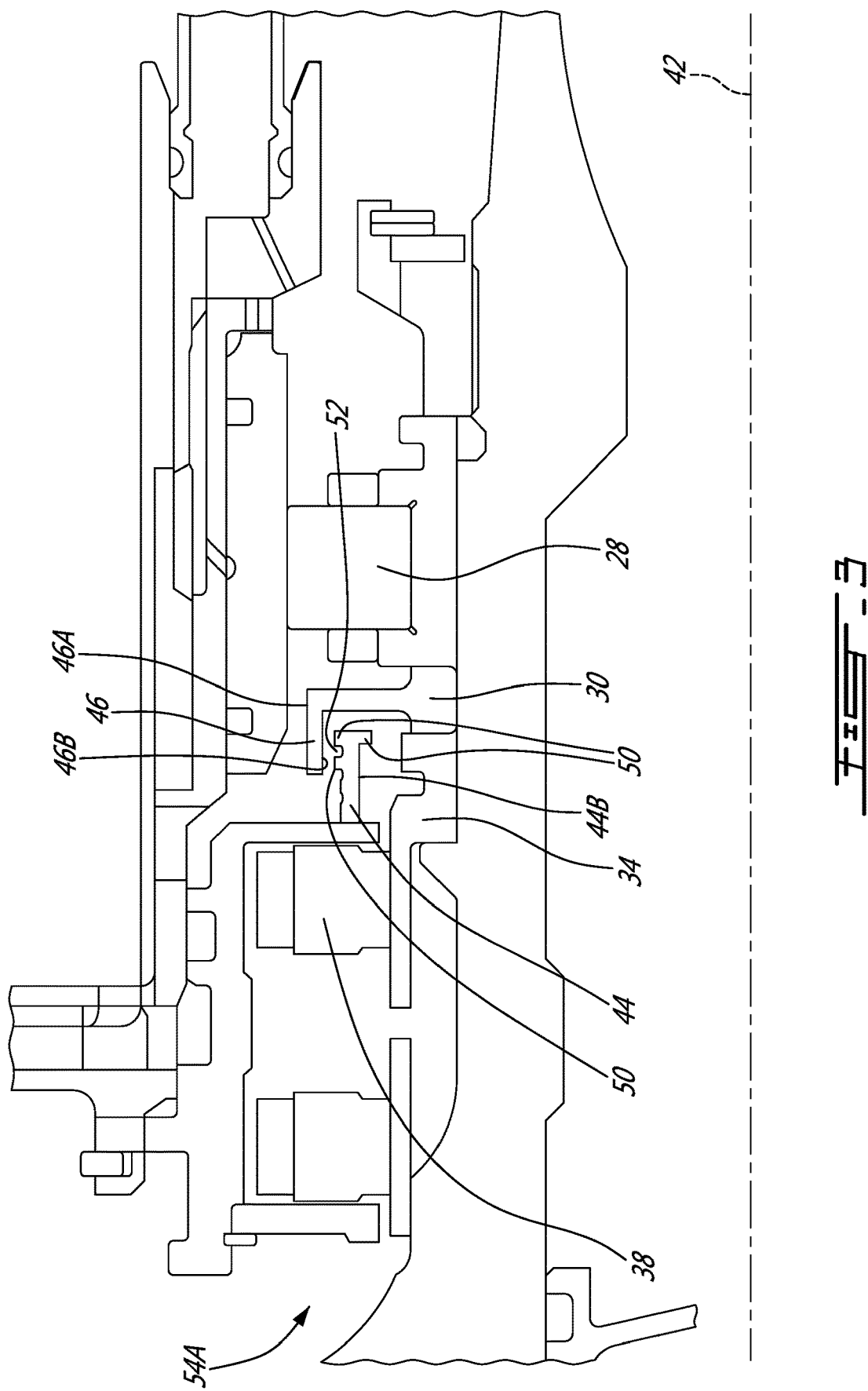

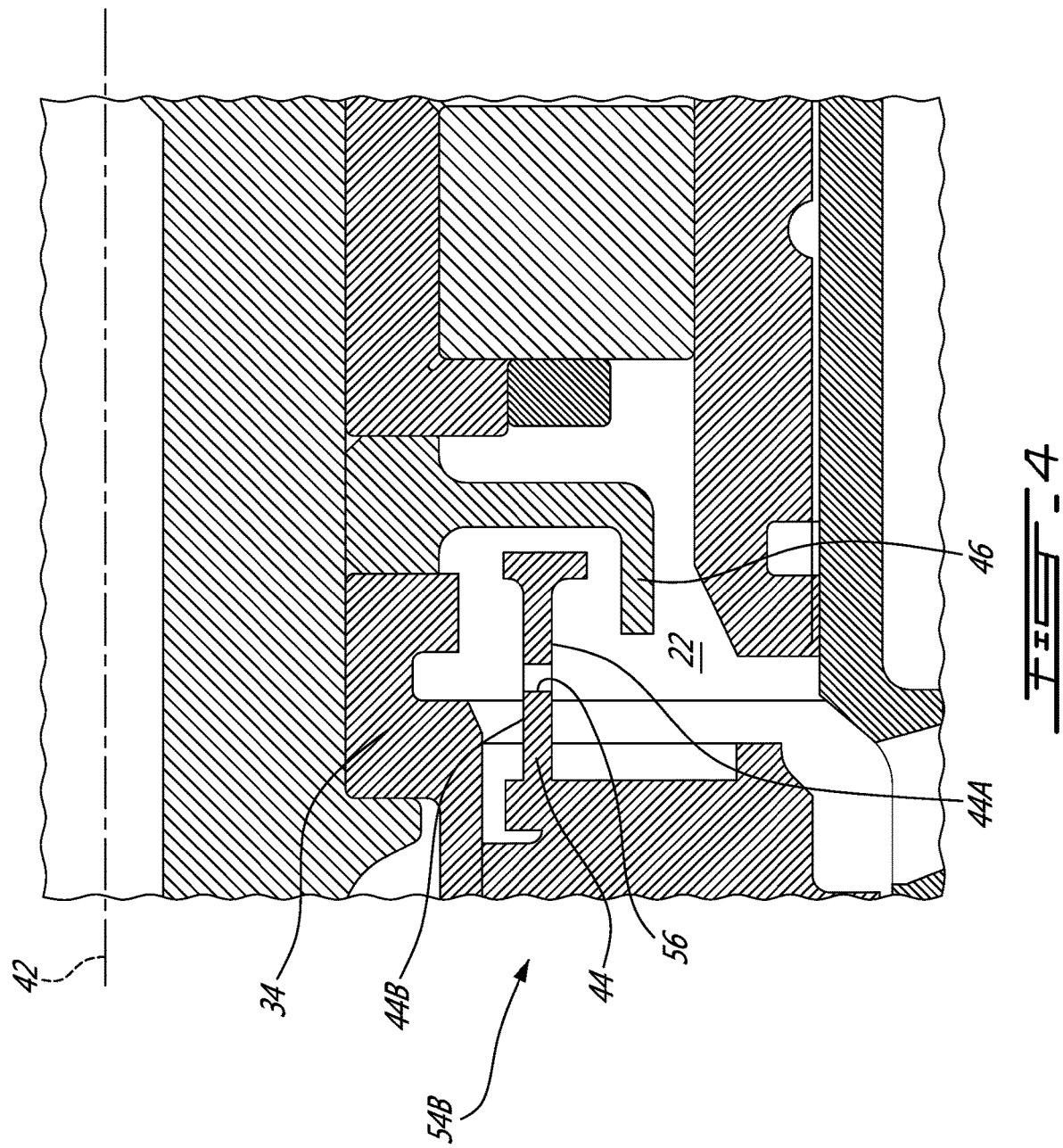

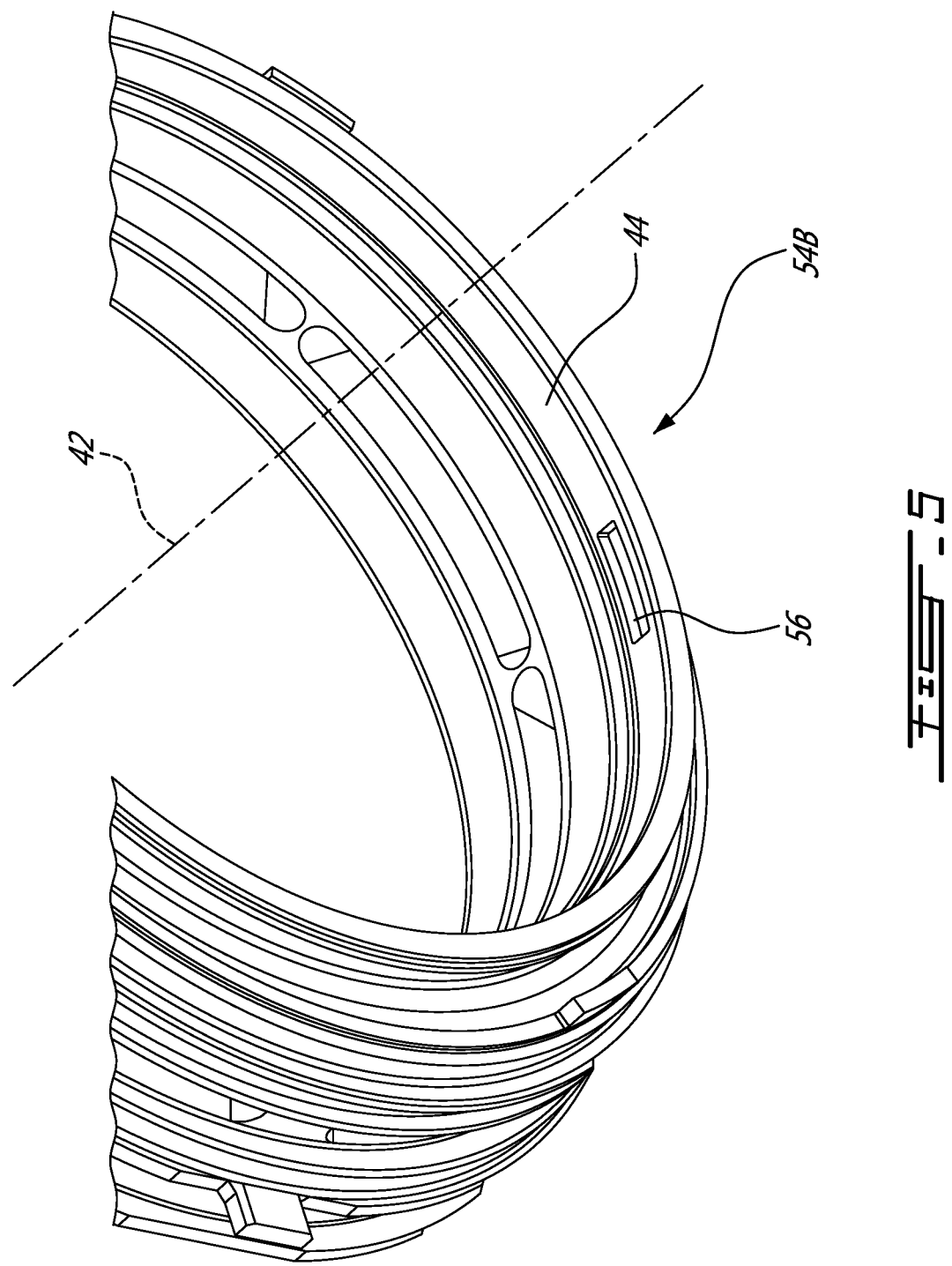

SEALING ASSEMBLY FOR A GAS TURBINE ENGINE

TECHNICAL FIELD

The application relates generally to sealing assemblies of gas turbine engines and, more particularly, to oil labyrinths and the like isolating the sealing assemblies from ambient oil.

BACKGROUND OF THE ART

Sealing assemblies, such as controlled-gap radial seals, may be used in gas turbine engines for providing sealing between cavities, such as between an oil cavity and an air cavity. A sealing assembly generally includes a seal element supported by a seal housing and a seal runner. In operation, under certain conditions, oil from the oil cavity may be splashed on the seal runner. A portion of the oil on the seal runner may then leak toward the seal element and reach a gap between the seal element and the seal runner, which may result in oil deposits forming in the gap. These oil deposits may compromise sealing performance of the sealing assemblies.

SUMMARY

In one aspect, there is provided a sealing assembly for sealing between an oil cavity and an air cavity of a gas turbine engine, the sealing assembly comprising a seal having a seal runner rotatably mounted around a center axis, a seal element configured to be disposed in the air cavity in a sealing relationship with the seal runner, and a seal housing receiving the seal element, the seal housing having an annulus extending circumferentially around the seal runner and axially along the center axis between a first surface and a second surface, the seal element abutting the second surface, the seal housing having a first annular extension extending away from the first surface along the center axis over the seal runner; and an oil slinger configured to be disposed in the oil cavity being rotatably mounted, and operable to rotate, around the center axis and having a second annular extension extending axially along the center axis and overlapping at least a portion of the first annular extension, the second annular extension being radially outward from the first annular extension relative to the center axis, the first annular extension and the second annular extension forming an oil channel therebetween.

In another aspect, there is provided a gas turbine engine comprising a rotatable member extending axially along a center axis; a frame of the gas turbine engine surrounding the center axis and being non-rotatable relative to the center axis; a seal runner mounted to the rotatable member and operable to rotate with the rotatable member; a seal housing mounted to the frame and having an annulus extending circumferentially around the center axis and axially along the center axis between a first surface and a second surface, the seal housing having a first annular extension extending axially along the seal runner from the first surface; and a second annular extension mounted to the rotatable member and extending axially along the center axis, the second annular extension overlapping at least a portion of the first annular extension and being radially outward relative to the first annular extension, the first annular extension and the second annular extension forming an oil channel therebetween.

In a further aspect, there is provided a method for sealing between an oil cavity and an air cavity of a gas turbine engine, the method comprising obstructing an oil flow from the oil cavity toward the air cavity; collecting oil in a channel defined between a seal housing and a rotatable member of the gas turbine engine; and flowing the oil in the channel circumferentially around a center axis of the rotatable member.

DESCRIPTION OF THE DRAWINGS

Reference is now made to the accompanying figures in which:

FIG. 3 is a view of the upper portion of the sealing assembly of FIG. 2 having an oil gap different from an oil gap shown in FIG. 2;

FIG. 4 is a cross-sectional view of a lower portion of a fragmented version of the sealing assembly of FIG. 2; and FIG. 5 is a perspective view of a seal housing of the sealing assembly of FIG. 2.

DETAILED DESCRIPTION

Figure 1:
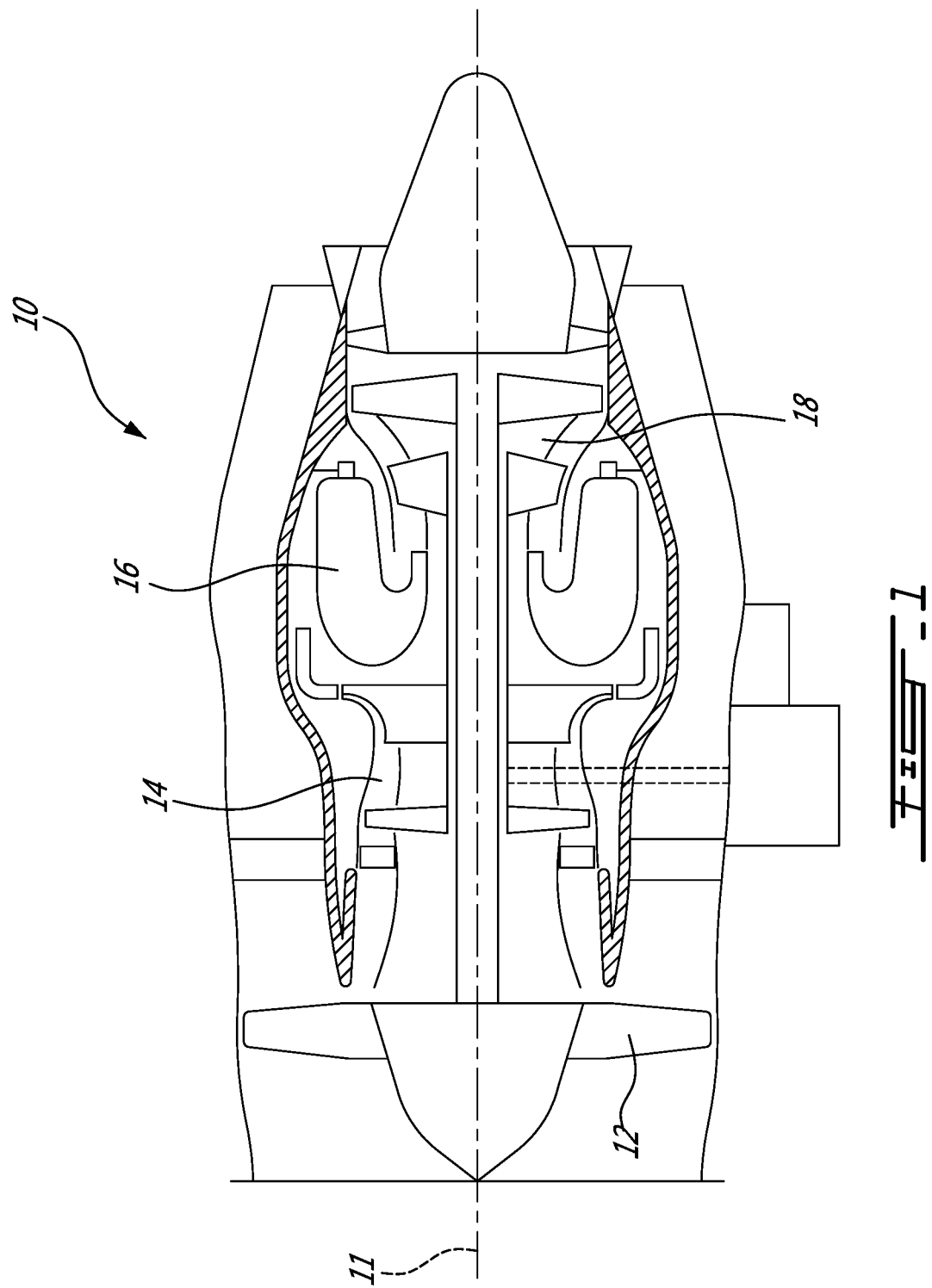
FIG. 1 is a schematic cross-sectional view of a gas turbine engine.

FIG. 1 illustrates a gas turbine engine 10 of a type preferably provided for use in subsonic flight, generally comprising in serial flow communication along an engine axis 11 a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
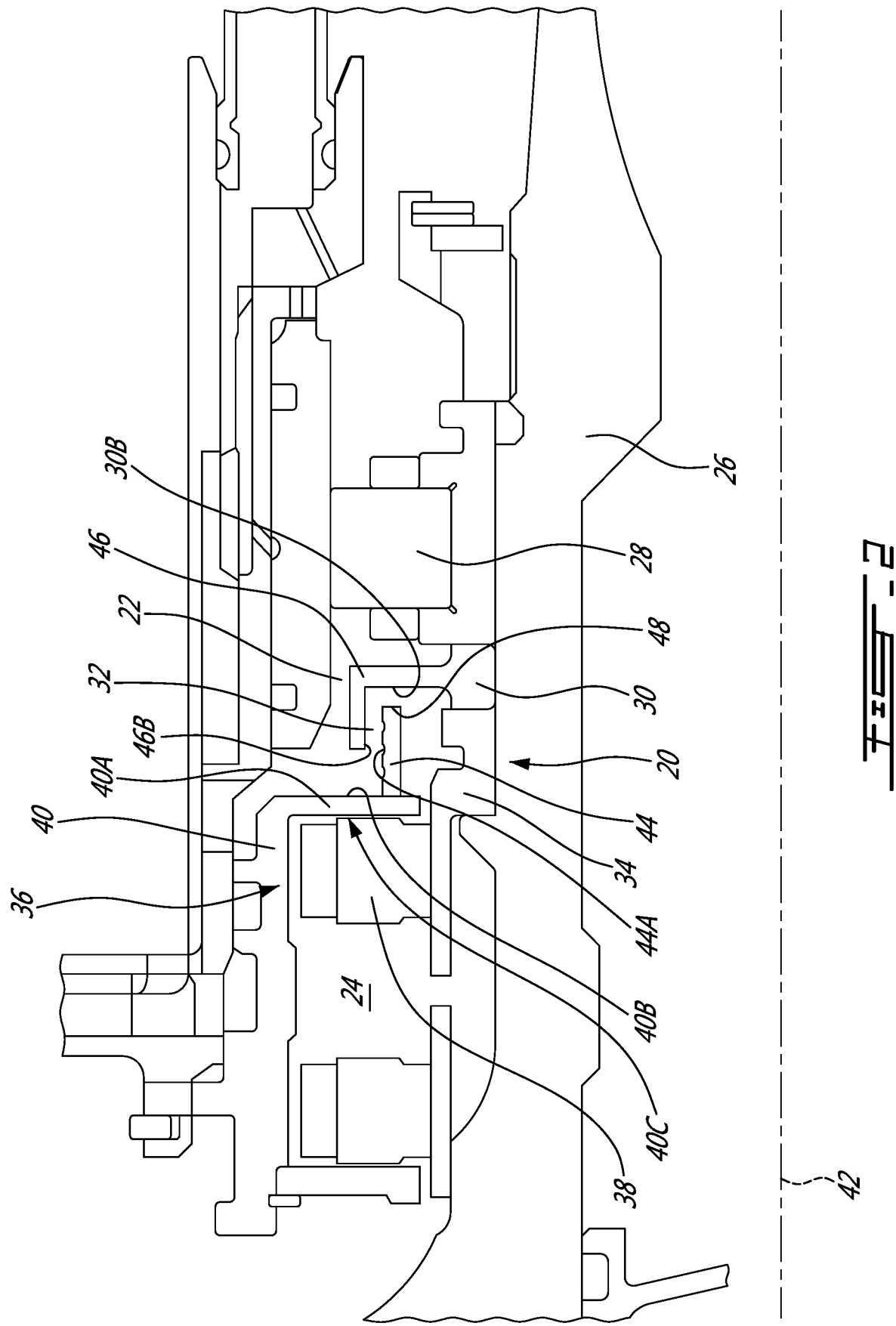
FIG. 2 is a cross-sectional view of an upper portion of a sealing assembly, mountable to the gas turbine engine of FIG. 1, in accordance with an embodiment of the present disclosure.

FIG. 2 illustrates a sealing assembly 20 that may be mounted in the gas turbine engine 10. The sealing assembly 20 can be used to seal a cavity, compartment, housing, or any suitable space from one more fluids, such as oils. For example, the sealing assembly 20 may be used to seal bearing cavities 22 containing oil. The bearing cavity 22 may also be referred to as an oil cavity 22. That is, the sealing assembly may be provided to seal the oil within the bearing cavity 22 and/or to avoid a flow of oil from the bearing cavity toward adjacent air or seal cavities 24. It is understood that the sealing assembly 20 is not limited to sealing bearing cavities 22 and may be used to seal other cavities of the gas turbine engine 10. In the embodiment shown in FIG. 2, the sealing assembly 20 includes a "controlled gap radial seal", as explained hereinafter.

In some embodiments, the sealing assembly 20 is mounted between the bearing cavity 22 and the adjacent air cavity 24. The bearing cavity 22 is intended to refer to any suitable cavity in which oil may circulate due to the lubrication of components in the cavity 22. The air cavity 24 is intended to refer to any cavity of the gas turbine engine 10 that aims to limit the presence of oil therein. The sealing assembly 20 may be mounted around a shaft 26 of the gas turbine engine 10 and surrounded by a casing, a frame, or like structure of the gas turbine engine 10. A bearing 28 may be mounted in the bearing cavity 22 and oil may be provided to the bearing cavity 22 to lubricate the bearing 28. The bearing 28 may support the shaft 26 of the gas turbine engine 10.

The bearing cavity 22 may contain rotatable components that rotate with the shaft 26 of the gas turbine engine 10. For example, an oil slinger 30 may be disposed in the bearing cavity 22 to impel the oil onto an interior wall of the bearing cavity 22, lubricate the bearing 28, or both. As used herein, the term "oil slinger" may include any device which contacts the oil and/or which utilizes a geometry to induce axial and radial oil flow.

In operation, the sealing assembly 20 is adapted to form an annular channel 32 or gap for obstructing an oil flow from the bearing cavity 22 toward the air cavity 24. The channel 32 may circulate the oil circumferentially around the shaft 26. The channel 32 may collect oil therein, if any, and drain the oil back to the bearing cavity 22, or any other cavity suitable to receive the oil, via a draining passage.

The sealing assembly 20 may include a seal runner 34 rotatable with the shaft 26 and a seal 36 at least partially surrounding the seal runner 34. The seal 36 may be non-rotatably mounted to the casing or the frame. That is, the seal 36 does not usually rotate during the operation of the gas turbine engine 10. The seal runner 34 and the corresponding seal 36 may be mounted between the bearing cavity 22 and the air cavity 24 to seal therebetween. In some examples, the seal runner 34 may be stationary. That is, the seal runner 34 may be non-rotatably mounted in the engine.

The seal 36 may include a seal element 38 and a seal housing 40 that receives the seal element 38. In operation, the seal element 38 may be mounted in the seal housing 40 such that the seal housing 40 circumferentially surrounds the seal element 38 and forms a sealing face that may be a sealing plane where the seal element 38 contacts the seal housing 40. In the embodiment shown in FIG. 2, a controlled gap seal is shown. In some embodiments, any type of seal may be used including, but not limited to, radial controlled gap carbon seal, face contact seal, radial contact seal, labyrinth seal, lip seal, and the like. Regardless of the type of seal 36 that may be used, the sealing assembly 20 is adapted to obstruct the oil flow path from the bearing cavity 22 to the air cavity 24 and collect and/or redirect the oil, if any, through the channel 32 and/or the draining passage.

The seal element 38 is intended to refer to any suitable element that can cooperate with the seal runner 34 in a sealing relationship to provide the controlled gap with the seal runner 34, or even rub against the seal runner 34 in some configurations so as to seal any clearance path. For example, the seal element 38 can be any suitable component such as a carbon ring. In operation, with a controlled gap embodiment, pressurized air in the air cavity 24 may flow toward the bearing cavity 22 through the controlled gap. As mentioned, while a controlled gap seal is described above, the sealing assembly 20 may have other configurations as well. For example, the sealing assembly 20 may include a seal element pressed against the seal housing 40, or against the seal runner 34. This is an example among others of the different seal assemblies that may be used in accordance with the present disclosure.

The seal housing 40 may be mounted to the casing and circumferentially surrounds at least a portion of the seal runner 34. The seal housing 40 may have a center axis 42 concentric with an axis of the seal runner 34 (i.e. the shaft 26) when the seal housing 40 is mounted to the gas turbine engine 10. The seal housing 40 defines an annulus body 40A or annulus that extends radially around the center axis 42 between an outer periphery and an inner periphery and that extends axially along the center axis between an exterior surface 40B and a contact surface 40C against which the seal element 38 is applied. The contact surface 40C is configured to abut the seal element 38 to form the sealing plane between the seal housing 40 and the seal element 38. In some embodiments, the contact surface 40C may define a surface that does not contact the seal element 38. The exterior surface 40B at least partially delimits the bearing cavity 24. The exterior surface 40B of the annulus body 40A may extend in a plane to which the center axis 42 is normal, although other geometrical relations are contemplated as well.

The seal housing 40 may define a first annular surface 44 which may, in one embodiment, be provided as an extension 44 or projection extending away from the exterior surface 40B along the center axis 42 and disposed to be spaced radially outwardly of the seal runner 34. By being integrated with the seal housing in this example, the first surface 44 sealingly cooperates with the seal housing 40 such that oil on the outer diameter of the first surface 44 cannot drip radially inward to the runner 34 in the region of the seal. The first surface 44 may be connected to other components of the engine, such as an annular body. The oil slinger 30 may define a second corresponding annular surface 46, such as extension 46 or projection which in this particular embodiment extends away from an exterior surface 30B of the oil slinger 30 toward the seal housing 40 to axially overlap the first surface 44. Each one of the surfaces 44, 46 have an inner periphery and a radially outer periphery relative to the center axis 42. One or both of the surfaces 44, 46 may not form a complete annulus or a ring. For example, in some embodiments the surface 44, 46 may form a partial loop or a partial circle. A rotating surface, such as the surface 46, may be balanced if it does not form a complete ring. Any other suitable configuration for providing first and second annular surfaces may be employed, depending on the particular seal and engine configuration.

In some embodiments, the surfaces 44, 46 overlap each other axially thereby forming the channel 32. The surfaces 44, 46 may be spaced-apart radially to provide the channel 32 therebetween. The overlap provides the obstruction to the oil flow path from the bearing cavity 22 to the air cavity 24. The second surface 46 may overlap at least a portion of the first surface 44. In some embodiments, the second surface 46 overlaps at least a quarter of a length of the first surface 44. In some embodiments, the second surface 46 overlaps at least a half of the length of the first surface 44. In some embodiments, the second surface 46 overlaps at least three quarters of the length of the first surface 44. In some embodiments, the second surface 46 overlaps substantially the full length of the first surface 44. The length of the first surface 44 may be measured from the exterior surface 40B to a free end 48 of the first surface 44. The overlap between the first surface 44 and the second surface 46 may depend on the on the particular seal and engine configuration. In some embodiment, the overlap between the first and second surfaces 44, 46 may be maximized to provide increase protection from oil leaks while minimizing vortices between the first and second surfaces 44, 46 in the channel 32. The vortices may cause pressure effects near the seal 36.

The second surface 46 may be radially outward from the first surface 44 relative to the center axis 42. That is, the inner periphery of the second surface 46 is larger than the outer periphery of the first surface 44. For example, the channel 32 may be defined between the outer periphery 44A of the first surface 44 and the inner periphery 46B of the second surface 46. A radial distance between the surfaces 44, 46 may be between 0.025 and 0.030 inches (25 to 30 thou). The gap may have any suitable radial distance to allow the oil to flow in the channel 32 circumferentially between the two surfaces 44, 46 and yet obstruct the oil flow longitudinally within the channel 32 along the center axis 42. For example, the channel 32 may be tapered along the center axis 42.

The second surface 46 may extend from another component of the gas turbine engine 10 instead of the oil slinger 30. For example, the second surface 46 may extend from a casing of the gas turbine engine 10 or another component connected to the shaft 26. The second surface 46 may be connected to a bearing race or a seal runner.

In some embodiments, the channel 32 may provide enough obstruction to the oil flow to limit or reduce the amount of oil that may leak from the bearing cavity 22 to the seal runner 34 and potentially toward the seal 36 and/or the seal element 38. The first surface 44, the second surface 46, and the channel 32, or any combination of these features may thus provide a shield against oil splashing on, or reaching, an outer diameter or periphery of the seal runner 34.

Referring to FIG. 3, the channel 32 may have one or more projections or fins 50 extending from any one of the surfaces 44, 46 within the gap to form an arrangement that may increase the obstruction of the oil flow path from the oil cavity 22 to the air cavity 24. The arrangement may form a labyrinth that may channel the fluid radially outward and radially inward relative to the center axis 42. The arrangement may form any suitable structure providing a tortuous path for the oil flow from the oil cavity 22 to the air cavity 24 and consequently increasing the obstruction for the oil to reach the seal runner 34.

The projections or fins 50 may be provided on the first surface 44, the second surface 46, or both surfaces 44, 46. The number and height of the projections 50 may be selected to provide the labyrinth and/or the tortuous path. The channel 32, including any projections 50 if any, can serve as a barrier to halt the flow of the oil toward the seal runner 34.

The first surface 44 may have one or more projections 50 extending radially outwardly from the outer periphery 44A relative to the center axis 42. The first surface 44 may have one or more projections 50 extending radially inwardly from the inner periphery 44B relative to the center axis 42.

The projection 50 may form an annular projection over the full circumference of the surface 44, 46 or extend along a portion of the full circumference of the surface 44, 46.

As shown in FIG. 3, the first surface 44 has two spaced-apart projections 50 extending from the outer periphery 44A toward the second surface 46 and one projection 50 extending from the inner periphery 44B toward the seal runner 34. Although the projections 50 are extending from the first surface 44 in FIG. 3, one or more of the projections 50 may extend from the second surface 46. In some embodiments, both surfaces 44, 46 may have projections 50 extending therefrom.

The overlap between the first and second surfaces 44, 46 may extend to cover all the projections 50 disposed in the gap between the surfaces 44, 46. In other words, all the projections 50 may be placed axially along the surfaces 44, 46 such that all the projections 50 extend radially between the first and second surfaces 44, 46. As shown in FIG. 3, the second surface 46 extends over all the projections 50 of the first surface 44.

Adjacent projections 50 such as those illustrated in FIG. 3 may form a groove 52 defined between the two spaced-apart projections 50. A grove may also be defined in the outer periphery 44A around the circumference of the first surface 44. The groove 52 may facilitate the flow of the oil in the channel 32.

In operation, any oil that may be splashed on the surfaces may be trapped in the channel 32 to reduce the amount of oil that may leak onto the seal runner 34. For example, any oil that may be splashed toward the seal 36 can be trapped in the channel 32 instead of being splashed directly on the seal runner 34. The oil within the channel 32 may flow circumferentially on the outer periphery 44A of the first surface 44 and/or on the inner periphery 46B of the second surface 46. In some embodiments, the groove 52 may facilitate the flow of the oil circumferentially along the surfaces 44, 46.

The surface 44, 46 is defined as having a top portion 54A (FIGS. 2-3) and a bottom portion 54B (FIG. 4). Although the terms "top portion" and "bottom portion" are used herein, it is understood that these relative terms are used to describe one element's relationship to another element as illustrated in the figures relative to a direction of gravity when the sealing assembly is mounted to the gas turbine engine 10. The top portion 54A is intended to refer to a portion that possesses a greater gravitational potential energy relative to the bottom portion 54B. The two portions 54A, 54B are not necessarily two distinct, or physically separate, portions. For example, the surfaces 44, 46 can be formed from an integral body. The top portion 54A of the first surface 44 is the upper half of the first surface 44, i.e., the portion positioned above a horizontal plane in which lies the center axis 42. Likewise, the bottom portion 54B is the lower half of the first surface 44, i.e., the portion positioned below the horizontal plane in which lies the center axis 42 when the seal housing 40 is mounted to the gas turbine engine 10. In FIGS. 2-4, such horizontal plane is perpendicular to the sheet of FIGS. 2-4. The bottom portion 54B may be defined as any part of the lower half of the first surface 44 and may exclude the complete lower half of the surface 44. For example, the bottom portion 54B may be defined as a segment smaller than the lower half. The bottom portion 54B may include a lowest circumferential position of the surface 44 relative to the direction of gravity when the seal 36 is mounted to the gas turbine engine 10. The lowest circumferential position can be referred to as including a "bottom-dead-center" of the surface 44. For greater clarity, the circumferential position is relative to an angular position around the center axis 42.

In applications where the gas turbine engine 10 may rotate relative to an airframe reference, such as in a tilt-rotor aircraft, the top and bottom portions 54A, 54B may be defined relative to a predetermined orientation of the engine 10 relative to the reference. For example, the predetermined orientation may include a take-off position, a shut-down position, a cruise flight position, or any other suitable position in which the engine 10 is oriented for a prolonged period of time.

Referring to FIGS. 4-5, the first surface 44 may include a draining opening 56 defined therethrough in the bottom portion 54B from the inner periphery 44B to the outer periphery 44A. The draining opening 56 defining a fluid passage to drain oil from a cavity defined between the seal runner 34 and the first surface 44 to an exterior of the cavity. In some embodiments, the exterior of the cavity is the bearing cavity 22. Thus, any oil flowing circumferentially along the inner periphery 44B of the first surface 44 may flow toward the bearing cavity 22 through the draining opening 56, by the effect of gravity. The draining opening 56 may be defined in the bottom portion 54B of the first surface 44 in a same circumferential position as the lowest circumferential position. In use, when the sealing assembly 20 is mounted in the gas turbine engine 10, the oil within the cavity on the inner periphery 44B of the first surface 44 may flow toward the draining opening 44 under gravity. In other words, since the draining opening 56 is located in the bottom portion 54B, and optionally when located at the lowest circumferential position, the gravitational forces may cause the oil to flow toward the lowest circumferential position and through the draining opening 56.

The above description is meant to be exemplary only, and one skilled in the art will recognize that changes may be made to the embodiments described without departing from the scope of the invention disclosed. For example, the rotating and static parts, the type of seals, the relative supports for the first and second annular surfaces, their respective shapes, etc., may have any suitable configuration to suit their particular environment. The sealing assembly may be used to seal the air cavity from cavities including other fluids. As such, a cooling fluid may be used instead of the oil. Still other modifications which fall within the scope of the present invention will be apparent to those skilled in the art, in light of a review of this disclosure, and such modifications are intended to fall within the appended claims.

The invention claimed is:

1. A sealing assembly between a first cavity and a second cavity of a gas turbine engine, the sealing assembly comprising:
    a seal runner mounted around a center axis;
    a seal element located around the seal runner and in a sealing relationship therewith;
    a seal housing receiving the seal element, the seal housing having a first annular extension extending away from the seal element at least partially along the center axis over the seal runner, and
    an annular body having a second annular extension extending at least partially along the center axis, the second annular extension overlapping at least a portion of the first annular extension, the second annular extension being radially outward of the first annular extension relative to the center axis, the first annular extension and the second annular extension forming a channel therebetween, the channel being unobstructed to circulate oil circumferentially within the channel.

2. The sealing assembly as defined in claim 1, wherein a radial distance between the first annular extension and the second annular extension is between 25 and 30 thou.

3. The sealing assembly as defined in claim 1, wherein the first annular extension has at least one annular projection extending radially outwardly relative to the center axis from the first annular extension toward the second annular extension.

4. The sealing assembly as defined in claim 3, wherein the second annular extension extends over all projections of the at least one annular projection.

5. The sealing assembly as defined in claim 1, wherein the first annular extension has at least one annular projection extending inwardly relative to the center axis.

6. The sealing assembly as defined in claim 1, wherein the first annular extension has an inner periphery and a radially outer periphery relative to the center axis, and a groove defined in the outer periphery around a circumference of the first annular extension.

7. The sealing assembly as defined in claim 1, wherein the first annular extension has an inner periphery and a radially outer periphery relative to the center axis, and two spaced-apart projections extending from one of the inner and outer peripheries, a groove defined between the two spaced-apart projections.

8. The sealing assembly as defined in claim 1, wherein the first annular extension has an inner periphery and a radially outer periphery relative to the center axis, and a draining opening defined therethrough between the inner periphery and the outer periphery, the draining opening defined in a portion of the first annular extension at a lowest circumferential position of the inner periphery relative to a direction of gravity when the seal is mounted to the gas turbine engine.

9. A gas turbine engine comprising:
    a rotatable member extending axially along a center axis,
    a frame of the gas turbine engine surrounding the center axis and being non-rotatable relative to the center axis,
    a seal runner mounted to the rotatable member and operable to rotate with the rotatable member,
    a seal housing mounted to the frame and having a first annular surface extending at least partially along the center axis over the seal runner, and
    an annular body mounted to the rotatable member and having a second annular surface extending at least partially along the center axis, the second annular surface overlapping at least a portion of the first annular surface and being radially outward of the first annular surface.

10. The gas turbine engine as defined in claim 9, comprising a seal element abutting a surface of the seal housing and being in a sealing relationship with the seal runner, the first annular surface extending at least to an end of the seal runner.

11. The gas turbine engine as defined in claim 9, wherein a radial distance between the first annular surface and the second annular surface is between 25 and 30 thou.

12. The gas turbine engine as defined in claim 9, wherein the first annular surface has at least one annular projection extending radially outwardly relative to the center axis from the first annular surface toward the second annular surface.

13. The gas turbine engine as defined in claim 12, wherein the second annular surface extends over all projections of the at least one annular projection.

14. The gas turbine engine as defined in claim 9, wherein the first annular surface has at least one annular projection extending inwardly relative to the center axis.

15. The gas turbine engine as defined in claim 9, wherein the first annular surface has an inner periphery and a radially outer periphery relative to the center axis, and a groove defined in the outer periphery around a circumference of the first annular surface.

16. The gas turbine engine as defined in claim 9, wherein the first annular surface has an inner periphery and a radially outer periphery relative to the center axis, and two spaced-apart projections extending from one of the inner and outer peripheries, a groove defined between the two spaced-apart projections.

17. The gas turbine engine as defined in claim 9, wherein the first annular surface has an inner periphery and a radially outer periphery relative to the center axis, and a draining opening defined therethrough between the inner periphery and the outer periphery, the draining opening defined in a portion of the first annular surface at a lowest circumferential position of the inner periphery relative to a direction of gravity when the seal is mounted to the gas turbine engine.

18. A controlled gap radial oil sealing assembly in a gas turbine engine having a centre rotational axis defining an axial direction, the controlled gap radial sealing assembly comprising:
    a seal element located around a cooperating seal runner and sized to define a controlled sealing gap between them, the seal runner having an axial length extending beyond an axial width of the seal element into an oiled region of the engine;

a first annular surface radially outwardly spaced from and extending substantially along the axial length of the seal runner, the first annular surface sealingly cooperating with a seal housing of the seal element; and a rotating second annular surface axially extending to overlap at least a portion of the first annular surface, the second annular surface radially outwardly spaced from the first annular surface relative to the center axis.

19. The controlled gap radial oil sealing assembly as defined in claim 18, wherein the first annular surface and the second annular surface form a channel therebetween, the channel being unobstructed to circulate oil circumferentially within the channel.

* * * * *